(12) United States Patent
Eaby

(10) Patent No.: US 11,519,155 B2
(45) Date of Patent: Dec. 6, 2022

(54) ELECTRICALLY-POWERED WHEEL ASSEMBLY FOR A WORK VEHICLE HAVING STACKED ELECTRIC MOTORS

(71) Applicant: CNH Industrial America LLC, New Holland, PA (US)

(72) Inventor: Jonathan Eaby, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 874 days.

(21) Appl. No.: 16/372,837

(22) Filed: Apr. 2, 2019

(65) Prior Publication Data

US 2020/0318315 A1 Oct. 8, 2020

(51) Int. Cl.
*B60K 1/02* (2006.01)
*B60K 1/00* (2006.01)
*E02F 9/20* (2006.01)
*B60W 10/08* (2006.01)

(52) U.S. Cl.
CPC ............. *E02F 9/207* (2013.01); *B60K 1/02* (2013.01); *B60W 10/08* (2013.01); *B60K 2001/006* (2013.01); *B60L 2200/40* (2013.01)

(58) Field of Classification Search
CPC ..... E02F 9/207; B60K 1/02; B60K 2001/006; B60W 10/08
See application file for complete search history.

(56) References Cited

U.S. PATENT DOCUMENTS

| 5,369,324 A * | 11/1994 | Saether ................. H02K 37/12 |
|---|---|---|
| | | 310/156.43 |
| 8,490,729 B2 | 7/2013 | Walser et al. |
| 8,758,178 B2 | 6/2014 | Gunji et al. |
| 10,017,054 B2 * | 7/2018 | Wu ..................... B60B 27/0047 |
| 2013/0096746 A1 * | 4/2013 | Hussain .......... B60W 30/18127 |
| | | 180/65.265 |
| 2014/0125205 A1 | 5/2014 | Landfors et al. |
| 2017/0225684 A1 * | 8/2017 | Alshamrani ......... B60K 26/021 |

FOREIGN PATENT DOCUMENTS

| CN | 103840609 A * | 6/2014 | .............. B60K 1/00 |
|---|---|---|---|
| CN | 106103166 A * | 11/2016 | .......... B60B 25/004 |
| DE | 10008451 A1 * | 8/2001 | .......... B62B 5/0026 |
| EP | 695662 A1 * | 2/1996 | .......... B60K 17/046 |

* cited by examiner

*Primary Examiner* — Jacob D Knutson
(74) *Attorney, Agent, or Firm* — Peter Zacharias; Patrick Sheldrake

(57) ABSTRACT

In one aspect, an electrically-powered wheel assembly for a work vehicle may include an axle and a wheel configured to rotate relative to the axle. The wheel may, in turn, be positioned outward from the axle in a radial direction such that a wheel cavity is defined between the wheel and the axle in the radial direction. The wheel assembly may also include a first electric motor configured to rotationally drive the wheel relative to the axle, with the first electric motor positioned within the wheel cavity and configured to receive electric power from a power source. Furthermore, the wheel assembly may include a second electric motor positioned within the wheel cavity and configured to rotationally drive the wheel relative to the axle, with the second electric motor configured to receive electric power through the first electric motor.

17 Claims, 5 Drawing Sheets

ELECTRICALLY-POWERED WHEEL ASSEMBLY FOR A WORK VEHICLE HAVING STACKED ELECTRIC MOTORS

FIELD OF THE INVENTION

The present disclosure generally relates to electrically-powered wheel assemblies for work vehicles and, more particularly, to an electrically-powered wheel assembly having a plurality of electric motors stacked on an axle of such assembly.

BACKGROUND OF THE INVENTION

Many work vehicles, such as construction and agricultural vehicles, are driven or otherwise propelled by a hydraulic drive system having one or more hydraulic pumps and one or more hydraulic motors. Although hydraulic pumps and motors provide adequate propulsive power in a compact package, the hydraulic drive system is a potential source of leaks and maintenance. As such, some work vehicles are now being propelled by electric motors as such motors are highly reliable due to their inherent simplicity. Recent technological advances have resulted in electrical motors that are small enough to fit within a variety of locations on the work vehicle. For example, one or more of the wheel assemblies of the work vehicle may include an electric motor installed or otherwise integrated therein. While such electrically-powered wheel assemblies provide various advantages (e.g., freeing up space typically occupied by various hydraulic drive system components), further improvements are needed.

Accordingly, an improved electrically-powered wheel assembly would be welcomed in the technology. In particular, an electrically-powered wheel assembly having a plurality of electric motors stacked on an axle of the wheel assembly would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an electrically-powered wheel assembly for a work vehicle. The wheel assembly may include an axle and a wheel configured to rotate relative to the axle, with the wheel positioned outward from the axle in a radial direction such that a wheel cavity is defined between the wheel and the axle in the radial direction. The wheel assembly may also include a first electric motor configured to rotationally drive the wheel relative to the axle, with the first electric motor positioned within the wheel cavity and configured to receive electric power from a power source. Furthermore, the wheel assembly may include a second electric motor positioned within the wheel cavity and configured to rotationally drive the wheel relative to the axle, with the second electric motor configured to receive electric power through the first electric motor.

In another aspect, the present subject matter is directed to an electrically-powered wheel assembly for a work vehicle. The wheel assembly may include an axle and a wheel configured to rotate relative to the axle, with the wheel positioned outward from the axle in a radial direction such that a wheel cavity is defined between the wheel and the axle in the radial direction. The wheel assembly may also include a first electric motor configured to rotationally drive the wheel relative to the axle, with the first electric motor positioned within the wheel cavity and configured to receive coolant from a coolant source. Moreover, the wheel assembly may include a second electric motor positioned within the wheel cavity and configured to rotationally drive the wheel relative to the axle, with the second electric motor configured to receive the coolant through the first electric motor.

In a further aspect, the present subject matter is directed to a method for increasing the output capacity of an electric wheel motor assembly. The electric wheel motor assembly may, in turn, include an axle and a wheel configured to rotate relative to the axle. The method may include decoupling an end cap from an end of the axle to provide access to a wheel cavity defined between the wheel and the axle. The electric wheel assembly may include a pre-existing electric motor positioned within the wheel cavity and configured to rotationally drive the wheel relative to the axle. The method may also include installing an additional electric motor within the wheel cavity, with the additional electric motor configured to rotationally drive the wheel relative to the axle. Moreover, the additional electric motor further configured to, when installed, receive electric power through the pre-existing electric motor. Additionally, the method may include re-installing the end cap relative to the end of the axle.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
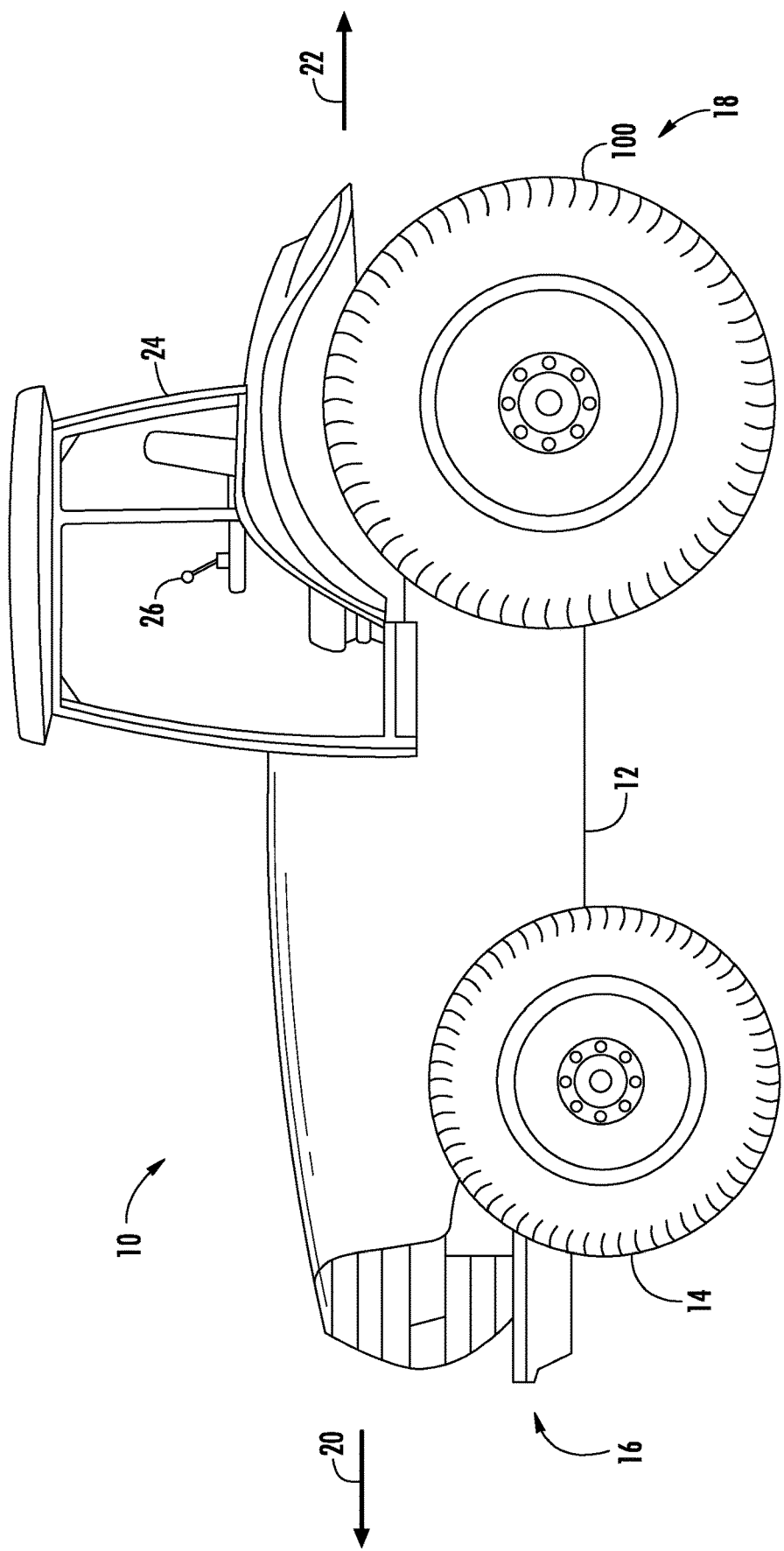
FIG. 1 illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an electrically-powered wheel assembly for a work vehicle. Specifically, in several embodiments, the wheel assembly includes an axle and a wheel configured to rotate relative to the axle, with the wheel positioned outward from the axle such that a wheel cavity is defined between the wheel and the axle. Furthermore, first and second electric motors may be positioned within the wheel cavity and configured to rotationally drive the wheel relative to the axle. Each motor may, in turn, include a stator and a rotor configured to rotate relative to the corresponding stator. For example, in one embodiment, the stators of the electric motors may be coupled to the axle, while the rotors of the electric motors may be coupled to the wheel. In such embodiment, when electric power is supplied to the stators, the rotors rotate relative to the stators, thereby causing the wheel to rotate relative to the axle in a manner that propels the work vehicle.

In accordance with aspects of the present subject matter, the first and second electric motors may be stacked along the axle within the wheel cavity. For example, the first electric motor may be installed onto the axle such that it is positioned against or otherwise in contact with a hub of the axle. The first electric motor may, in turn, be configured to receive electric power from an electric power source (e.g., via an electrical connector on the hub) and/or coolant from a coolant source (e.g., via a coolant passage defined by the hub). The second motor may then be installed onto axle such that it positioned against or otherwise in contact with the first motor. The second electric motor may, in turn, be configured to receive electric power and/or coolant through the first electric motor (e.g., via an electrical connector on and/or a coolant passage defined by the first motor, respectively). Such a configuration may permit additional electrical motors to be stacked along the axle to increase the output capacity of the wheel assembly, with such additional motors receiving electric power and/or coolant through an adjacent motor (e.g., a third electric motor may receive electric power and/or coolant through the second motor).

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders, and/or the like.

As shown in FIG. 1, the work vehicle 10 may include a frame or chassis 12 configured to support or couple to a plurality of components. For example, a pair of steerable, unpowered wheel assemblies 14 (one is shown) may be coupled to the chassis 12 adjacent to a forward end 16 of the work vehicle 10. Furthermore, a pair of electrically-powered wheel assemblies 100 (one is shown) may be coupled to chassis 12 adjacent to a rear end 18 of the work vehicle 10. As such, the electrically-powered wheel assemblies 100 may be configured to propel the work vehicle 10 in a forward direction of travel 20 and/or in a reverse direction of travel 22. Additionally, an operator's cab 24 may be supported by a portion of the chassis 12 and may house various control devices 26 (e.g., levers, pedals, control panels and/or the like) for permitting an operator to control the operation of the work vehicle 10. However, in alternative embodiments, the work vehicle 10 may have any other suitable configuration. For example, the electrically-powered wheel assemblies 100 may be positioned adjacent to the forward end 16 of the work vehicle 10, while the unpowered wheel assemblies 14 may be positioned adjacent to the rear end 18 of the work vehicle 10. Moreover, in some embodiments, the electrically-powered wheel assemblies 100 may be positioned adjacent to both of the forward and rear ends 16, 18 of the work vehicle 10 such that all of the wheels of the vehicle 10 are electrically-powered.

It should be further appreciated that the configuration of the work vehicle 10 described above and shown in FIG. 1 is provided only to place the present subject matter in an exemplary field of use. Thus, it should be appreciated that the present subject matter may be readily adaptable to any manner of vehicle configuration.

Figure 2:
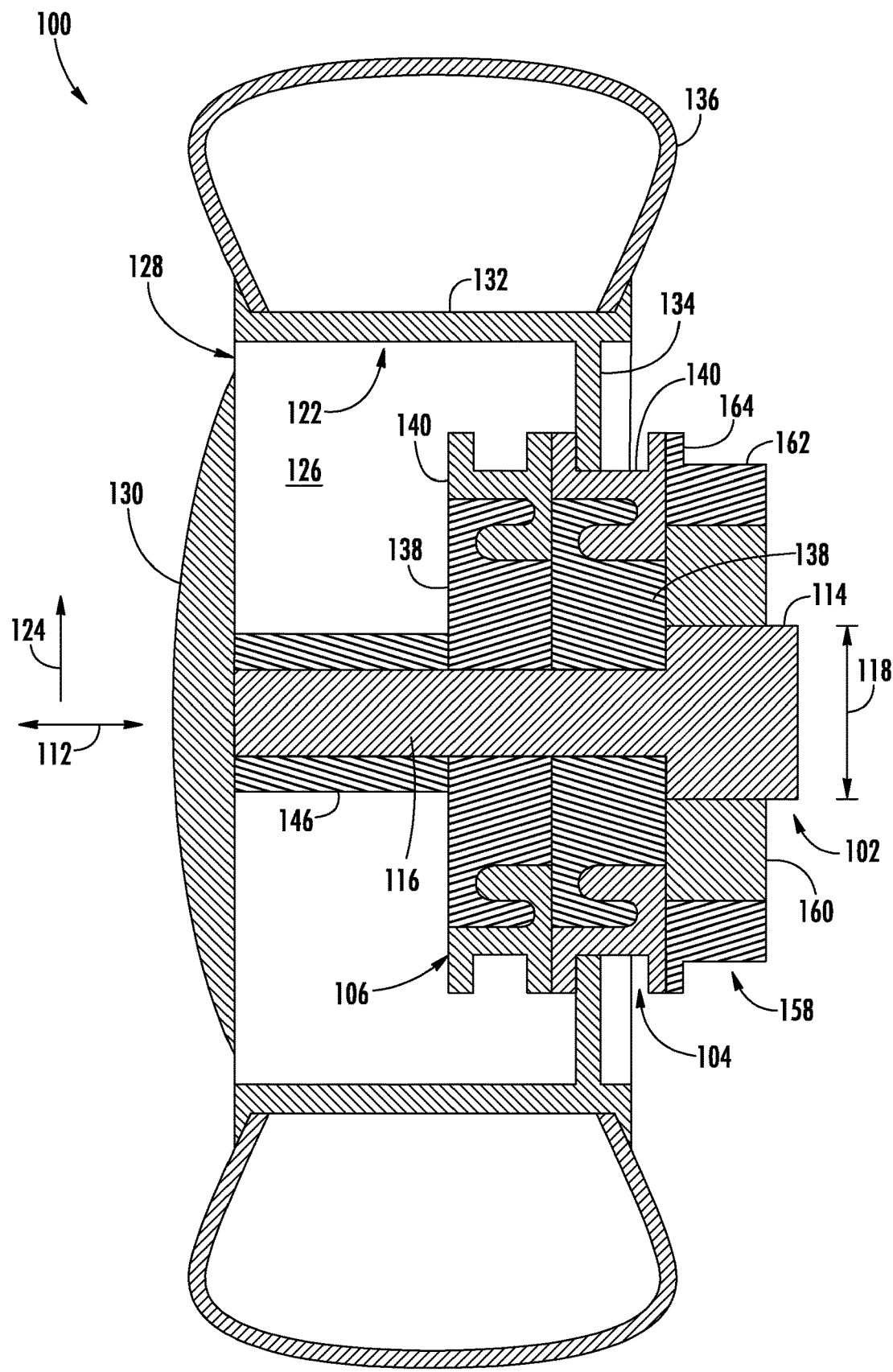
FIG. 2 illustrates a cross-sectional view of an electrically-powered wheel assembly for a work vehicle in accordance with aspects of the present subject matter.
Figure 3:
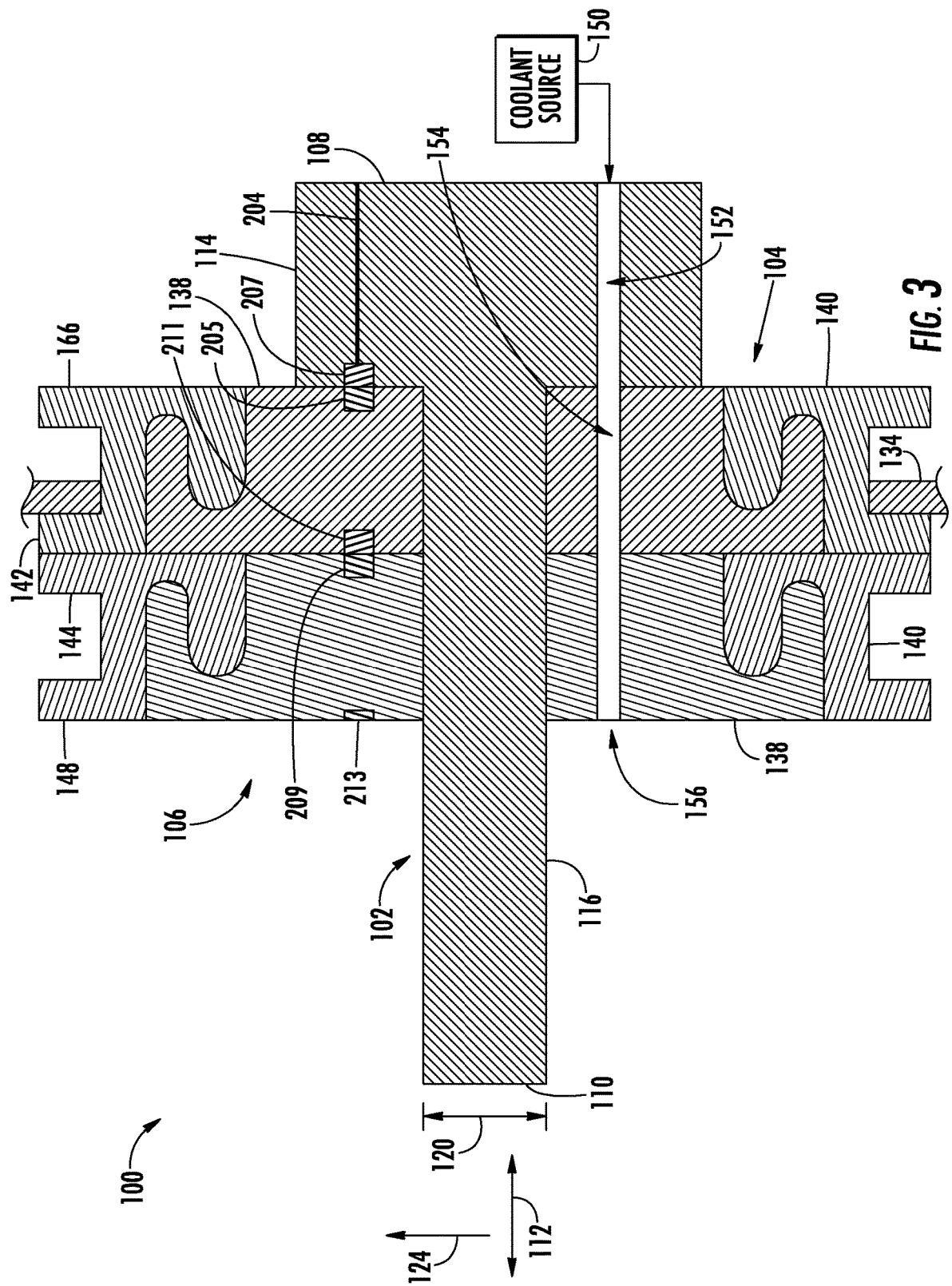
FIG. 3 illustrates a simplified cross-sectional view of the electrically-powered wheel assembly shown in FIG. 2, particularly illustrating an axle, a first electric motor, and a second electric motor of the wheel assembly.

Referring now to FIGS. 2 and 3, differing views of one embodiment of an electrically-powered wheel assembly 100 are illustrated in accordance with aspects of the present subject matter. Specifically, FIG. 2 illustrates a cross-sectional view of the wheel assembly 100. Additionally, FIG. 3 illustrates a simplified cross-sectional view of the wheel assembly 100 shown in FIG. 2, particularly illustrating an axle 102, a first electric motor 104, and a second electric motor 106 of the wheel assembly 100.

As shown in FIGS. 2 and 3, the axle 102 may extend from a first or inner end 108 to a second or outer end 110 in an axial direction (e.g., as indicated by arrow 112 in FIG. 2). In general, the inner end 108 of the axle 102 may be configured to be coupled to the chassis 12 of the work vehicle 10 (FIG. 1). As such, when the wheel assembly 100 is installed on the work vehicle 10, the inner end 108 of the axle 102 may generally be positioned adjacent to the interior of the vehicle 10 (e.g., a longitudinal centerline of the vehicle 10), while the outer end 110 of the axle 102 may generally be positioned adjacent to the exterior of the vehicle 10 (e.g., the exterior surface or skin of the vehicle 10). Specifically, in several embodiments, the axle 102 may include an axle hub 114 positioned adjacent to its first end 108, with the hub 114 configured to be coupled to the chassis 12. Furthermore, the axle 102 may include an axle shaft 116 extending from the axle hub 114 to its second end 110 in the axial direction 112. As shown, the diameter of axle hub 114 (e.g., as indicated by arrow 118 in FIG. 2) may be larger than the diameter of the axle shaft 116 (e.g., as indicated by arrow 120 in FIG. 3). Additionally, as will be described below, the axle hub 114 may include one or more electrical connectors and/or one or more coolant passages configured to provide electric power and coolant, respectively, to the first and second electric motors 104, 106 of the wheel assembly 100. However, in alternative embodiments, the axle 102 may have any other suitable configuration.

Furthermore, as shown in FIG. 2, the electrically-powered wheel assembly 100 may include a wheel 122 configured to configured to rotate relative to the axle 102, thereby propelling or moving the work vehicle 10 in the forward and/or reverse directions of travel 20, 22. Specifically, in several embodiments, the wheel 122 may be positioned outward from the axle 102 in a radial direction (e.g., as indicated by arrow 124 in FIG. 2), with the radial direction 124 being perpendicular to the axial direction 112. In this regard, a wheel cavity 126 may be defined between the wheel 122 and the axle 102 in the radial direction 124. As will be described below, the first and second electric motors 104, 106 may be positioned within the wheel cavity 126 and coupled between the axle 102 and the wheel 122. Additionally, the wheel 122 may also define an access opening 128 that provides access to the wheel cavity 126, such as to permit installation and/or removal of the motors 104, 106. To prevent access to the wheel cavity 126 (e.g., when the motors 104, 106 are in operation or otherwise being supplied with electric power), an end cover 130 may be removably coupled to the second end 110 of the axle 102 such that the end cover 130 is positioned within the access opening 128.

In several embodiments, the wheel 122 may include annular wall 132 and a rib 134. More specifically, the annular wall 132 may generally extend circumferentially around the axle 102 such that the wall 132 defines the outer perimeter of the wheel cavity 126 in the radial direction 124. The annular wall 132 may also extend in the axial direction 112 from the second end 110 of the axle 102 toward the first end 108 of the axle 102. Moreover, the rib 134 may extend inwardly from the annular wall 132 toward the axle 102. As will be described below, the first and/or second electric motors 104, 106 may be coupled to the wheel 122 via the rib 134. In this regard, the rib 134 may extend inwardly from the annular wall 132 at any location along the axial direction 112 that provides for structural integrity of the wheel 122. For example, in one embodiment, the first and second electric motors 104, 106 may be positioned between the rib 134 and the second end 110 of the axle 102 (e.g., outboard of the rib 134). Alternatively, the motors 104, 106 may be positioned between the rib 134 and the first end 108 of the axle 102 (e.g., inboard of the rib 134) or on either side of the rib 134. Moreover, in one embodiment, the rib 134 may extend along the entire circumference of the annular wall 132. However, in an alternative embodiment, the rib 134 may include a plurality of rib segments (not shown), with each segment extending along a portion of the circumference of the annular wall 132. Furthermore, a tire 136 (e.g., a pneumatic tire) may be mounted on the annular wall 124 to provide traction between the wheel assembly 100 and the surface across which the work vehicle 10 is traveling.

In accordance with aspects of the present subject matter, the first and second electric motors 104, 106 may be configured to rotationally drive the wheel 122 relative to the axle 102. More specifically, as shown in FIGS. 2 and 3, each motor 104, 106 may include a stator 138 and a rotor 140, with the rotor 140 configured to rotate relative to the corresponding stator 138. As such, in several embodiments, the motors 104, 106 may be positioned within the wheel cavity 126 such that stators 138 are coupled to the axle shaft 116 and the rotors 140 are coupled to the wheel 122 (e.g., via the rib 134). For example, in one embodiment, the axle shaft 116 may include a plurality splines (not shown) configured to engage a plurality of grooves (not shown) defined by the stators 138. In this regard, when electric power is supplied to the stators 138, the rotors 140 rotate relative to the corresponding stators 138, thereby causing the wheel 122 to rotate relative to the axle 102 in a manner that propels the work vehicle 10 in one of the forward or reverse directions of travel 20, 22. However, in alternative embodiments, the motors 104, 106 may be coupled to the axle 102 and the wheel 122 in any other suitable manner.

As shown in FIGS. 2 and 3, in several embodiments, the electric motors 104, 106 may be stacked along the axle 102. Specifically, in one embodiment, the first electric motor 104 may be installed within the wheel cavity 126 such that the motor 104 is positioned against or otherwise in contact with the axle hub 114. For example, the stator 138 of the first electric motor 104 may be coupled the axle shaft 116 adjacent to the axle hub 114, while a flange 142 extending outward from the rotor 140 of the motor 104 may be coupled to the rib 134. Moreover, in such embodiment, the second electric motor 106 may be installed within the wheel cavity 126 such that it is positioned against or otherwise in contact with the first electric motor 104. For instance, the stator 138 of the second electric motor 106 may be coupled the axle shaft 116 adjacent to the first motor 104, while a flange 144 extending outward from the rotor 140 of the motor 106 may be coupled to the flange 142 of the first motor 104. As such, the first and second motors 104, 106 may generally be aligned with each other in the radial direction 124. Furthermore, an annular spacer 146 may be installed on the axle shaft 116 between the second electric motor 106 and the end cap 130 to prevent the motors 104, 106 from sliding relative to the axle 102 during operation. Moreover, in one embodiment, the annular spacer 146 may be configured to plug or otherwise terminate the coolant passages and/or the electrical connections of the second electric motor 106. However, in alternative embodiments, the coolant passages and/or the electrical connections of the second motor 106 may be plugged/terminated in any other suitable manner (e.g., via a cap(s)). Additionally, in alternative embodiments, the first and second motors 104, 106 may be stacked along the axle 102 in any other suitable manner.

It should be appreciated that additional electric motors may be stacked along the axle 102 in addition to the first and second electric motors 104, 106. For example, in embodiment, the stator of a third electric motor (not shown) may be coupled to the axle shaft 116 adjacent to the second motor 106, while a flange extending outward from the rotor of the third motor may be coupled to a flange 148 of the second motor 106. Subsequent electric motors (e.g., a fourth electric motor, a fifth electric motor, etc.) may be stacked along the axle 102 in a similar manner. As such, the output capacity of the wheel assembly 100 may be adjusted by stacking more or fewer electric motors along the axle 102.

Referring now to FIG. 3, the first and second electric motors 104, 106 may be cooled with suitable liquid-based coolant. Specifically, in several embodiments, the first electric motor 104 may be configured to receive coolant from a coolant source 150 (e.g., a radiator or other suitable liquid reservoir), and the second electric motor 106 may be configured to receive coolant through the first motor 104. For example, in one embodiment, the axle hub 114 may define an axle hub cooling passage 152 configured to receive coolant from the coolant source 150. Moreover, the stator 138 of the first electric motor 104 may define a first motor cooling passage 154, and the stator 138 of the second electric motor 106 may define a second motor cooling passage 156. In this regard, when the first electric motor 104 is positioned against the axle hub 114, the first motor cooling passage 154 may be in fluid communication with to the axle hub cooling passage 152 such that the cooling passage 154 is configured to receive coolant from the cooling passage 152. Similarly, when the second electric motor 106 is positioned against the first electric motor 104, the second motor cooling passage 156 may be in fluid communication with the first motor cooling passage 154 such that the cooling passage 156 is configured to receive coolant from the cooling passage 154. In such embodiment, the inlets and outlets of the cooling passages 152, 154, 156 may generally be aligned with each other in the radial direction 124.

It should be appreciated that any additional electric motors installed within the wheel cavity 126 may be configured to receive coolant from an adjacent electric motor. For example, when a third electric motor (not shown) is installed within the wheel cavity 126 such that it is positioned against or otherwise in contact with the second electric motor 106, the third electric motor may be configured to receive coolant through the second electric motor 106. Such a cooling configuration allows stacking of additional electric motors along the axle 102 as described above without the need for a dedicated cooling passage or cooling line for each motor.

Referring specifically to FIG. 2, in several embodiments, the wheel assembly 100 may include a braking assembly 158. In general, the first and/or second motors 104, 106 may be used to brake or otherwise reduce the ground speed of the work vehicle 10. In this regard, during braking, the motors 104, 106 may generate electric power, such as for recharging a battery(ies) of the work vehicle 10. However, in certain instances, when the motors 104, 106 are generating the maximum amount of electric power, a further reduction in ground speed may still be needed. As such, the braking assembly 158 may provide supplemental braking and a stationary braking (e.g., as a parking brake). Specifically, the braking assembly 158 may include a stationary frictional element 160, such as a brake shoe or a brake caliper, and a rotating element 162, such as a brake drum or a brake disc. For example, in one embodiment, the stationary frictional element 106 may be coupled to the axle hub 114 (e.g., via complementary splines and grooves). Furthermore, a flange 164 extending outward from the rotating element 162 in the radial direction 124 may be coupled to a complementary flange 166 (FIG. 3) extending outward from the rotor 140 of the first electric motor 104 in the radial direction 124. As such, when the braking assembly 158 is activated, a braking actuator (not shown), such as an electric linear actuator, may push the stationary frictional element 160 against the rotating element 162, thereby slowing or preventing the rotation of the wheel 122 relative to the axle 102. However, in alternative embodiments, the braking assembly 158 may have any other suitable configuration for slowing or preventing the rotation of the wheel 122 relative to the axle 102.

Figure 4:
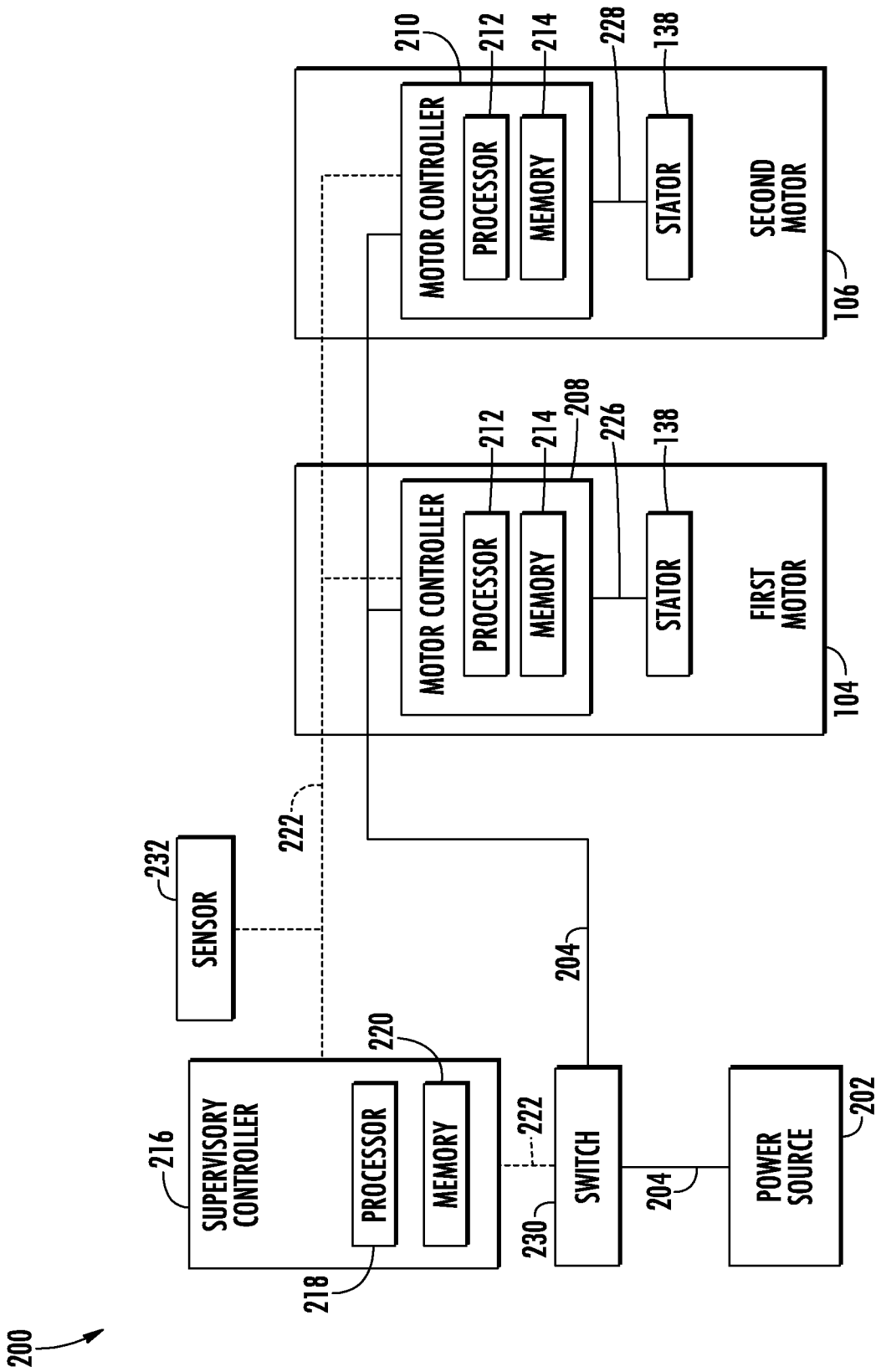
FIG. 4 illustrates a schematic view of one embodiment of an electrical system of the electrically-powered wheel assembly shown in FIGS. 2 and 3, particularly illustrating the various electrical and communicative links/couplings of the wheel assembly.

Referring now to FIG. 4, a schematic view of one embodiment of an electrical system 200 of the wheel assembly 100 is illustrated in accordance with aspects of the present subject matter. As shown, the first and second electric motors 104, 106 may be configured to receive electric power from a power source 202, with the second electric motor 106 configured to receive electric power through the first motor 104. Specifically, in several embodiments, an electric circuit 204 may extend from the power source 202 through the axle hub 114 to the first electric motor 104 (e.g., a motor controller of the motor 104) such that electric power from the power source 202 is supplied to the first electric motor 104. For example, as shown in FIG. 3, in one embodiment, when the first electric motor 104 is positioned against the axle hub 114, an electrical connector 205 on the motor 104 may engage a complementary electrical connector 207 on the hub 114, thereby permitting power to flow through the electric circuit 204 to the first motor 104. Additionally, the electric circuit 204 may extend through the first electric motor (e.g., its motor controller) to the second electric motor 106 (e.g., a motor controller of the motor 106) such that electric power may flow from the power source 202 through the first electric motor 104 to the second electric motor 106. For instance, as shown in FIG. 3, when the second electric motor 106 is positioned against the first electric motor 104, an electrical connector 209 on the second motor 106 may engage a complementary electrical connector 211 on the first motor 104, thereby permitting power to flow through the first motor 104 to the second motor 106.

It should be appreciated that any additional electric motors installed within the wheel cavity 126 may be configured to receive electric power through an adjacent electric motor. For example, when a third electric motor (not shown) is installed within the wheel cavity 126 such that it is positioned against or otherwise in contact with the second electric motor 106, the third electric motor may be configured to receive electric power through the second electric motor 106 (e.g., an electrical connector on the third motor may engage a complementary electrical connector 213 on the second motor 106). Such an electrical configuration allows stacking of additional electric motors along the axle 102 as described above without the need for a dedicated electric circuitry or power supply wire/cable for each motor.

Furthermore, it should be appreciated that the power source 202 may correspond to any suitable device(s) configured to store electric power. For example, in one embodiment, the power source 202 may correspond to one or more suitable batteries. However, in alternative embodiments, the power source 202 may correspond to any other suitable device, such as an electric generator, an ultracapacitor, and/or the like.

In several embodiments, the electrical system 200 may include a plurality of controllers to control the operation of the first and second electric motors 104, 106. Specifically, in one embodiment, a first motor controller 208 may be positioned on and/or within or otherwise associated with the first electric motor 104, with such controller 208 being configured to control the operation of the motor 104. Furthermore, a second motor controller 210 positioned on and/or within or otherwise associated with the second electric motor 106, with such controller 210 being configured to control the operation of the motor 106. In general, each motor controller 208, 210 may comprise any suitable processor-based device known in the art, such as a computing device or any suitable combination of computing devices. Thus, in several embodiments, each motor controller 208, 210 may include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of each motor controller 208, 210 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 214 may generally be configured to store suitable computer-readable instructions that, when implemented by the corresponding processor(s) 212 configure the corresponding controller 208, 210 to perform various computer-implemented functions.

Furthermore, the system 200 may include a supervisory controller 216 positioned on and/or within or otherwise associated with the work vehicle 10. In general, the supervisory controller 216 may comprise any suitable processor-based device known in the art, such as a computing device or any suitable combination of computing devices. Thus, in several embodiments, the supervisory controller 216 may include one or more processor(s) 218 and associated memory device(s) 220 configured to perform a variety of computer-implemented functions. Such memory device(s) 220 may generally be configured to store suitable computer-readable instructions that, when implemented by the processor(s) 218 configure the supervisory controller 216 to perform various computer-implemented functions.

It should be appreciated that the supervisory controller 216 may correspond to an existing controller(s) of the work vehicle 10, itself, or the supervisory controller 216 may correspond to a separate processing device. For instance, in one embodiment, the supervisory controller 216 may form all or part of a separate plug-in module that may be installed in association with the work vehicle 10 to allow for the disclosed systems to be implemented without requiring additional software to be uploaded onto existing control devices of the work vehicle 10. It should also be appreciated that the functions of the supervisory controller 216 may be performed by a single processor-based device or may be distributed across any number of processor-based devices, in which instance such devices may be considered to form part of the supervisory controller 216.

In addition, the controllers 208, 210, 216 may also include various other suitable components, such as a communications circuit or module, a network interface, one or more input/output channels, a data/control bus and/or the like, to allow controllers 208, 210, 216 to be communicatively coupled to each other and/or any other system components described herein. In several embodiments, as shown in FIG. 4, a communicative link or interface 222 (e.g., a data bus) may be provided between the supervisory controllers 216 and the first and second motor controllers 208, 210 to allow the supervisory controller 216 to communicate with each motor controller 208, 210 via any suitable communications protocol (e.g., CANBUS). For example, when the first electric motor 104 is positioned against the axle hub 114, complementary communications connectors (not shown) on the motor 104 and the axle hub 114 may engage each other, thereby communicatively coupling the supervisory controller 216 and the first motor controller 208. Moreover, when the second electric motor 106 is positioned against the first electric motor 104, complementary communications connectors (not shown) on the motors 104, 106 may engage each other, thereby communicatively coupling the supervisory controller 216 and the second motor controller 210. As such, the communicative link 222 may allow the supervisory controller 216 to communicate with each motor controller 208, 210 without relying on the other motor controller 208, 210.

In several embodiments, the controllers 208, 210, 216 may be configured to independently control the operation of the first and second electric motors 104, 106. In general, such independent control of the motors 104, 106 may allow the motors 104, 106 to provide differing power outputs and/or permit one motor 104, 106 to operate when the other electric motor 104, 106 is not operating. For example, the supervisory controller 216 may be configured to receive an input associated with a desired power output of the wheel assembly 100, such as from one or more of the control devices 26 within the operator's cab 24 of the work vehicle 10. Based on such input, the supervisory controller 216 may transmit instructions to the first motor controller 208 of the first electric motor 104 (e.g., via the communicative link 222). Such instructions may include a selected output for the first electric motor 104. Thereafter, the first motor controller 208 may be configured to transmit an amount (e.g., amperage) of electric power associated with the selected output of the first motor 104 from the electric circuit 204 to the stator 138 of the motor 104 (e.g., via an electrical coupling 226) based on the instructions received from the supervisory controller 216. Furthermore, the supervisory controller 216 may be configured to transmit the instructions to the second motor controller 210 (e.g., via the communicative link 222). Based on such instructions, the second motor controller 210 may be configured to transmit an amount (e.g., amperage) of electric power associated with the selected output of the second motor 106 from the electric circuit 204 to the stator 138 of the motor 106 (e.g., via an electrical coupling 228). In this respect, the instructions from the supervisory controller 216 may be transmitted along the communicative link 222 until such instructions reach the corresponding motor controller. In such embodiments, the instructions may not pass through or otherwise be transmitted by one of the motor controllers to another motor controller.

It should be appreciated that any additional electric motors installed within the wheel cavity 126 may be independently controlled in a similar manner. For example, when a third electric motor (not shown) is installed within the wheel cavity 126 such that it is positioned against or otherwise in contact with the second electric motor 106, the third electric motor may be configured to receive instructions from the supervisory controller 216 via the communicative link 222) (e.g., via complementary communications connectors on the second and third motors). Such a communications configuration allows independent control of the additional electric motor without the need for dedicated connector on the axle shaft 118 for each motor. However, in alternative embodiments, the instructions may be transmitted from one motor controller to an adjacent motor controller in a "daisy-chained" manner.

Furthermore, the supervisory controller 216 may be configured to halt the flow of electric power from the power source 202 to the axle hub 114 when the end cover 130 has been removed from the axle 102. Specifically, as shown in FIG. 4, the electric circuit 204 may include a switch 230 configured to selectively control the flow of electric power from the power source 202 to the axle hub 114. As such, when the switch 230 is closed, electric power may flow from the power source 202 to the axle hub 114 and subsequently to the first and second electric motors 104, 106. However, the flow of electric power from the power source 202 to the axle hub 114 is halted when the switch 230 is opened. In one embodiment, decoupling the end cap 130 from the second end 110 of the axle 102 may physically open the switch 230. As such, electric power is unable to flow to the axle hub 114 when the end cap 130 has been removed from the wheel assembly 100, such as when electric motors are being installed and/or removed from the wheel assembly 100. Once the end cap 130 has been reinstalled, the switch 230 may be physically closed, thereby permitting the flow of electric power to the axle hub 114.

In another embodiment, the operation of the switch 230 may be controlled based on feedback received from a sensor 232 configured to detect when the end cap 130 has been removed. More specifically, the sensor 232 may be communicatively coupled to the supervisory controller 216 (e.g., via the communicative link 134) to permit the controller 216 to receive sensor data from the sensor 232. Thereafter, the supervisory controller 216 may be configured to process/analyze the received sensor data to determine when the end cap 130 has been decoupled from the second end 110 of the axle 102. When it is determined that the end cap 130 has been removed, the supervisory controller 216 may be configured to open the switch 230 to halt the flow of electric power to the axle hub 114 and subsequently to the first and second electric motors 104, 106. Once the end cap 130 has been reinstalled, the supervisory controller 216 may close switch 230 to permit the flow of electric power to the axle hub 114. It should be appreciated that the sensor 232 may correspond to any suitable sensor configured to detect contact between the end cap 130 and the axle 102, such as a contact sensor, a proximity sensor, and/or the like.

Figure 5:
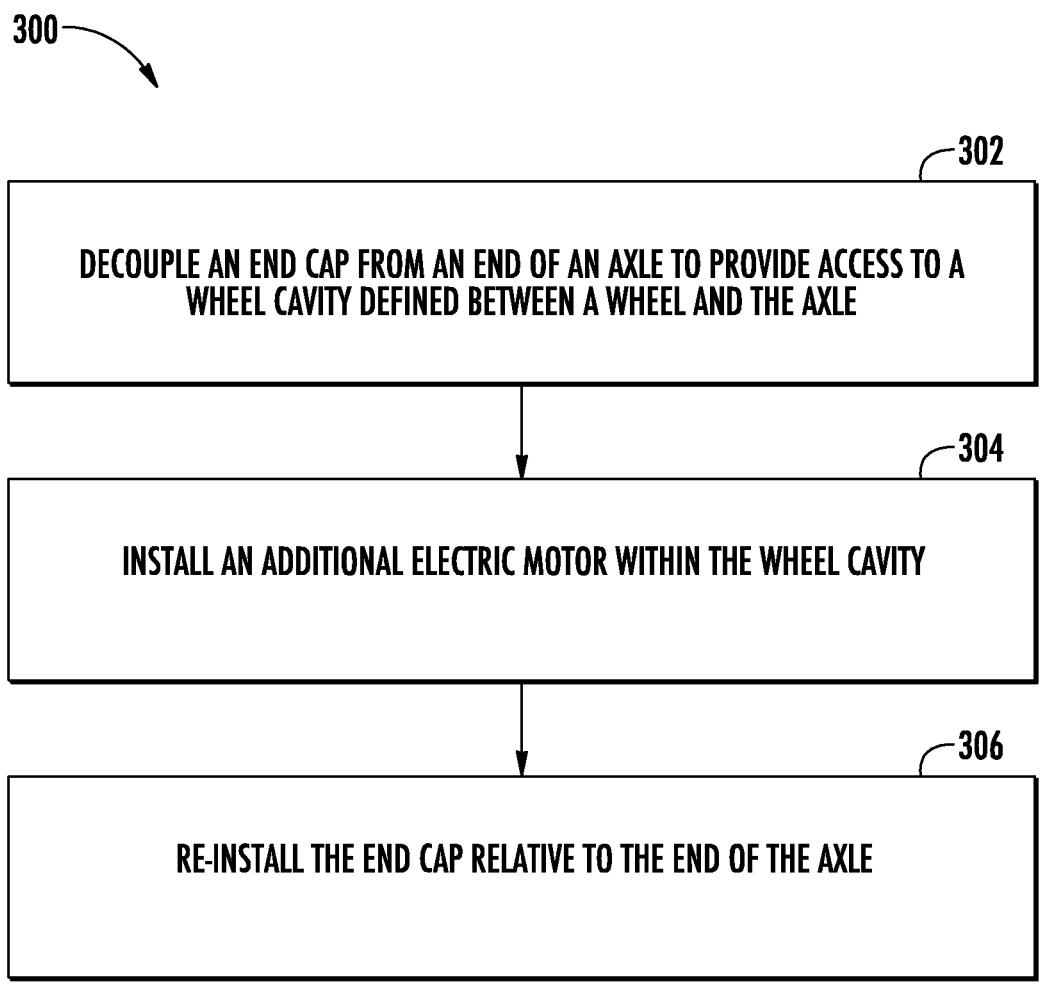
FIG. 5 illustrates a flow diagram of one embodiment of a method for increasing the output capacity of an electric wheel motor assembly in accordance with aspects of the present subject matter.

Referring now to FIG. 5, a flow diagram of one embodiment of a method 300 for increasing the output capacity of an electric wheel motor assembly is illustrated in accordance with aspects of the present subject matter. In general, the method 300 will be described herein with reference to the wheel assembly 100 described above with reference to FIGS. 1-3. However, it should be appreciated by those of ordinary skill in the art that the disclosed method 300 may generally be implemented with any wheel assembly having any suitable assembly configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include decoupling an end cap from an end of an axle to provide access to a wheel cavity defined between a wheel and the axle. For instance, the end cap 130 may be decoupled or otherwise removed from the second end 110 of the axle 102 to provide access to the wheel cavity 126. Furthermore, if installed, the annular spacer 146 may be removed from the axle shaft 116 to provide access to the first and/or second electric motors 104, 106.

Additionally, at (304), the method 300 may include installing an additional electric motor within the wheel cavity. For instance, in one embodiment, an additional electric motor (e.g., a third electric motor) may be installed within the wheel cavity 126. In such embodiment, the additional electric motor may be stacked along the axle 102 such that it is positioned against or otherwise in contact with a pre-existing electric motor (e.g., the second electric motor 106). When the additional electric motor is positioned against the pre-existing electric motor, the third additional motor may be configured to receive electric power and/or coolant directly from the pre-existing electric motor. Subsequent additional electric motors (e.g., a fourth electric motor, a fifth electric motor, etc.) may be installed within the wheel cavity 126 in a similar manner. It should be appreciated that the installation of an additional electric motor(s) may increase the output capacity of the wheel assembly 100. Furthermore, the additional motors may be positioned within the wheel cavity 126 and/or the position of the pre-existing motor within the wheel cavity 126 may be adjusted to create the desired wheel spacing of the work vehicle 10 based on the spacing of the crops in the field across which the vehicle 10 will be traveling. As such, the motors may be positioned between the rib 134 and the second end 110 of the axle 102, between the rib 134 and the first end 108 of the axle 102, or on either side of the rib 134. For example, in one embodiment, a first motor may be positioned between the rib 134 and the first end 108, a second motor may be positioned between the rib 134 and the first motor, and a third motor may be positioned between the rib 134 and the second end 110.

Moreover, as shown in FIG. 5, at (306), the method 300 may include re-installing the end cap relative to the end of the axle. For instance, a second annular spacer (e.g., a spacer having a shorter axial length than the spacer 146 to accommodate the additional electric motor(s)) may be installed on the axle shaft 116. Thereafter, the end cap 130 may be reinstalled on to the second end 110 of the axle 102.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An electrically-powered wheel assembly for a work vehicle, the wheel assembly comprising:
   an axle;
   a wheel configured to rotate relative to the axle, the wheel positioned outward from the axle in a radial direction such that a wheel cavity is defined between the wheel and the axle in the radial direction;
   a first electric motor configured to rotationally drive the wheel relative to the axle, the first electric motor positioned within the wheel cavity and further configured to receive electric power from a power source, the first electric motor including a first electrical connector; and
   a second electric motor positioned within the wheel cavity and configured to rotationally drive the wheel relative to the axle, the second electric motor including a second electrical connector configured to engage the first electrical connector of the first electric motor such that the second electric motor is configured to receive electric power through the first electric motor via the first and second electrical connectors.

2. The wheel assembly of claim 1, wherein the first electric motor and the second electric motor are configured to be independently controlled.

3. The wheel assembly of claim 2, wherein the first electric motor comprises a first controller configured to control an operation of the first electric motor and the second electric motor comprises a second controller configured to control an operation of the second electric motor.

4. The wheel assembly of claim 3, wherein the first controller is further configured to receive electric power from the power source and the second controller is further configured to receive electric power through the first electric motor via the first and second electrical connectors.

5. The wheel assembly of claim 1, wherein the first electric motor and the second electric motor are aligned within the wheel cavity in the radial direction.

6. The wheel assembly of claim 5, wherein the axle extends from a first end to a second end in an axial direction, the first electric motor and the second electric motor configured to engage the axle such that the first electric motor and the second electric motor are stacked along the axle such that the first electrical connector engages the second electrical connector.

7. The wheel assembly of claim 1, wherein the first electric motor comprises a stator coupled to the axle and a rotor coupled the wheel, the second electric motor comprising a stator coupled to the axle and a rotor coupled the wheel.

8. The wheel assembly of claim 1, wherein the wheel defines an access opening configured to provide access to the wheel cavity, the wheel assembly further comprising:
an end cap removably coupled to an end of the axle to cover the access opening in a manner that prevents access to the wheel cavity.

9. The wheel assembly of claim 8, further comprising:
an electric circuit configured to supply electric power from the power source to the first electric motor, wherein, when the end cap is decoupled from the end of the axle, the electric circuit is opened such that the supply of electric power to the axle and the first electric motor is halted.

10. The wheel assembly of claim 8, further comprising:
a sensor configured to detect whether the end cap is coupled to the end of the axle; and
a controller communicatively coupled to the sensor, the controller configured to:
determine when the end cap is decoupled from the end of the axle based on data received from the sensor; and
halt the supply of the electric power to the axle and the first electric motor when the end cap is decoupled from the end of the axle.

11. The wheel assembly of claim 8, further comprising:
a spacer configured to slidingly engage the axle such that the spacer is positioned between the second electric motor and the end cap.

12. The wheel assembly of claim 1, wherein the first electric motor is configured to receive coolant from a coolant source and the second electric motor is configured to receive the coolant through the first electric motor.

13. The wheel assembly of claim 12, wherein the first electric motor comprises a stator coupled to the axle and the second electric motor comprises a stator coupled to the axle, the stator of the first electric motor defining a first coolant passage configured to receive the coolant from the coolant source, the stator of the second electric motor defining a second coolant passage in fluid communication with and configured to receive the coolant from the first coolant passage.

14. The wheel assembly of claim 1, further comprising:
a rib extending inward from the wheel in the radial direction, wherein at least one of the first electric motor or the second electric motor is coupled to the rib.

15. An electrically-powered wheel assembly for a work vehicle, the wheel assembly comprising:
an axle;
a wheel configured to rotate relative to the axle, the wheel positioned outward from the axle in a radial direction such that a wheel cavity is defined between the wheel and the axle in the radial direction;
a first electric motor configured to rotationally drive the wheel relative to the axle, the first electric motor positioned within the wheel cavity and configured to receive coolant from a coolant source, the first electric motor including a stator coupled to the axle, the stator of the first electric motor defining a first coolant passage configured to receive the coolant from the coolant source; and
a second electric motor positioned within the wheel cavity and configured to rotationally drive the wheel relative to the axle, the second electric motor including a stator coupled to the axle, the stator of the second electric motor defining a second coolant passage in fluid communication with and configured to receive the coolant from the first coolant passage of the first electric motor.

16. A method for increasing the output capacity of an electric wheel motor assembly, the electric wheel motor assembly comprising an axle and a wheel configured to rotate relative to the axle, the method comprising:
decoupling an end cap from an end of the axle to provide access to a wheel cavity defined between the wheel and the axle, the electric wheel assembly including a pre-existing electric motor including a first electrical connector positioned within the wheel cavity and configured to rotationally drive the wheel relative to the axle;
installing an additional electric motor including a second electrical connector within the wheel cavity such that the second electrical connector engages the first electrical connector of the pre-existing electric motor, the additional electric motor configured to rotationally drive the wheel relative to the axle, the additional electric motor further configured to, when installed, receive electric power through the pre-existing electric motor via the first and second electrical connectors; and
re-installing the end cap relative to the end of the axle.

17. The method of claim 16, further comprising:
removing a first spacer from the axle after decoupling the end cap, the first spacer having a first length; and
installing a second spacer onto the axle after installing the second electric motor, the second spacer having a second length that is less than the first length.

* * * * *